United States Patent Office 3,646,046
Patented Feb. 29, 1972

3,646,046
1,6-DIMETHYL-10α-ERGOLINE DERIVATIVES
Federico Arcamone, Giovanni Franceschi, Alfredo Glasser, and Luciano Dorigotti, Milan, Italy, assignors to Societá Farmaceutici Italia, Milan, Italy
No Drawing. Filed Mar. 4, 1969, Ser. No. 804,287
Claims priority, application Italy, Mar. 7, 1968, 13,625/68
Int. Cl. C07d 43/20
U.S. Cl. 260—285.5     7 Claims

ABSTRACT OF THE DISCLOSURE

Described are compounds of the formula:

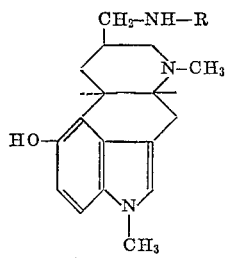

wherein R is selected from the group consisting of the radical of an aliphatic, cycloaliphatic, aromatic and heterocyclic organic acid having from 1 to 10 carbon atoms which may be substituted by halogen, hydroxy, nitro, amino or alkylamino groups, alkyl, aryl, alkoxy, aryloxy, thio-ether or sulphonic groups, of the radical of an alkyl, arylcarbonic and dialkylcarbamic acid, and a process for the preparation thereof. The compounds possess an antienteraminic, oxytocic, adrenolytic, hypotensive and sedative activity.

The present invention relates to new derivatives of the 1,6-dimethyl-10α-ergoline, useful in therapy, and to the process for the preparation thereof. More particularly, the present invention has among its object the new 12-hydroxy derivatives of the 1,6-dimethyl-10α-ergoline having the structural formula:

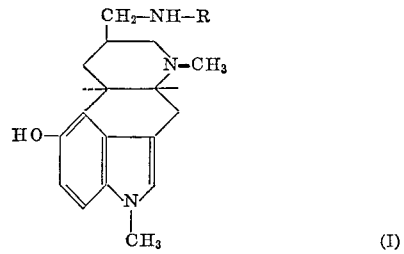

wherein R is selected from the group consisting of the radical of an aliphatic, cycloaliphatic, aromatic and heterocyclic organic acid having from 1 to 10 carbon atoms, which may be substituted by halogen, hydroxy, nitro, amino or alkylamino groups, alkyl aryl, alkoxy, aryloxy, thio-ether or sulphonic groups, of the radical of an alkyl, arylcarbonic and dialkylcarbamic acid, and the process for the preparation thereof.

The 8β-N-acylamino derivatives of 1,6-dimethyl-10α-ergoline and 1,6-dimethyl-2,3-dihydro-10α-ergoline are known (U.S. Pat. No. 3,238,211 and U.S. Pat. 3,557,118), having antienteraminic, oxytocic, adrenolytic, hypotensive and sedative activity.

We have found that the compounds of the invention are more active and have a more immediate effect compared to the known compounds. The products of the invention, having the Formula I, are prepared from the corresponding 1,6-dimethyl-2,3-dihydro-10α-ergoline derivatives having the formula:

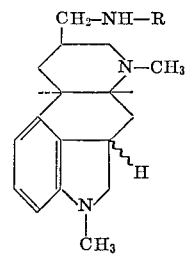

where R has the above meaning.

The starting products (II), described in Belgian Pat. No. 702,014, (U.S. 3,557,118) are oxidized with the potassium nitrosodisulphonate, which is prepared according to the method described by Singh R. P., Canad. J. Chem., 44, 1966, page 1994. The reaction is preferably carried out in a buffered acid solution at a pH between 2 and 5, initially at room temperature and then in the cold. The products thus obtained are isolated and purified by the known techniques of extraction with suitable solvents and by chromatography. Typical examples of the compounds of the present invention are the corresponding N-acyl derivatives of the following acids: acetic, trimethylacetic, propionic, butyric, valerianic, hexanoic, heptanic, octanoic, decanoic, cyclopentancarboxylic, cyclopentylpropioni, succinic, benzoic, 2-nitrobenzoic, 3-chlorobenzoic, salicylic, methylbenzoic, 2-methoxybenzoic, methylthiosalicylic, 2,6-dimethoxybenzoic, 3,4,5 - trimethoxybenzoic, phenylpropionic, phenoxy-acetic, α-phenoxypropionic, diethylcarbamic, chloroacetic, N,N-diethylaminoacetic, trimethylacetic, α-phenoxybutyric, butyl carbonic, isobutyl carbonic, ethyl carbonic, propyl carbonic, isopropyl carbonic, benzyl carbonic, N-ethylanthranylic, N,N-dimethylanthranylic, p-toluensulphonic, methansulphonic, pyrrole-2-carboxylic, N-pyrrolidine-acetic, nicotinic, isonicotinic, pyridin-3,5-dicarboxylic, pyridin - 3 - sulphonic, lutidinic, pyridin-3-acetic, picolinic, pyridin-3-isobutyric, piperiden-2-carboxylic, 3-ethyl-piperidin-4-acetic, indole-3-acetic, imidazole-4-acetic, pyrazinic, piperazin-1-acetic, piperazin-2-dimethylaminoethyl-1-carboxylic, pyrimidine-4-carboxylic, pyrimidine-5-bromo - 2 - carboxylic, pyrimidine-5-amino-2-methyl - 4 - carboxylic, furane-3-methyl-2-carboxylic, furane - 2 - carboxylic, pyrane-2,6-dicarboxylic, thiophene-3-carboxylic, thiophene - 2,4 - disulphonic, isooxazole - 3 - carboxylic, isooxazole-5-amino-3-methyl-4-carboxylic, N-morpholin-acetic, thiomorpholin-3,5-dicarboxylic, thiazole-2-carboxylic, thiazole-4-methyl-2-carboxylic, thiazole-2-amino-4-carboxylic, thiazole-2-hydroxy-4-carboxylic and thiazole-2-acetic acid.

The compounds of the invention are particularly useful as anticephalgic, antiallergic and antiinflammatory drugs. They are administered by oral or parenteral route and are particularly used in the following clinical indications: hemicrania, trigeminal neuralgia, allergy in general and inflammatory states. The therapeutical compositions commonly used contain one of the compounds of the invention, with a certain quantity of solid or liquid vehicle. The therapeutical compositions can be prepared in the form of powders, pills, tablets, elixir or other forms pharmaceutically suitable to the oral administration. Liquid diluents, duly sterilized, may be employed for the parenteral administration. Some excipients may be employed, among which the most suitable are: starch, lactose, magnesium stearate talc or other excipients usually employed for this purpose.

We have found that the biological activity of the products of the invention is antagonistic to the serotonine action; the antagonist effect appears in a very short time after the administration of the product and is rapid.

The antiserotonine activity has been tested both "in vitro" and "in vivo." It was tested "in vitro" according to the method described by Stone et al. (J. Pharm. Exp. Ther. 131, p. 73, 1961) which is based on the inhibition of the contracting action of serotonine on the rat uterus. It has been found that the value of $EC_{50}$ of 1,6-dimethyl-$8\beta$ - N - carbobenzoxyaminomethyl - $12\alpha$ - hydroxy-$10\alpha$-ergoline, that is the concentration able to produce the inhibition of 50% of spasmogen effects caused by serotonine, is 0.000000005 γ/cc. "In vivo," the antiserotonine activity was checked by the method described by W. Doepfener and A. Cerletti (Int. Arch. Allergy 12, pages 89–97, 1958). This method is based upon the inhibition of 50% of edema caused by serotonine on a rat's paw. Table 1 lists the results obtained of $ED_{50}$, that is the dose (in γ/kg.) able to produce the 50% of inhibition of the effects caused by serotonine in the animals treated with gradual doses of the product under examination and at different periods of time from the administration of the antagonist to the administration of agonist, serotonine.

TABLE 1

| Time from the administration of the antagonist to that of serotonine (minutes): | $ED_{50}$ (γ/kg.) [1] |
|---|---|
| 15 | 35 |
| 30 | 50 |
| 60 | 80 |

[1] 1,6 - dimethyl-$8\beta$-N-carbobenzoxyaminomethyl-$12\alpha$-hydroxy-$10\alpha$-ergoline, intravenously.

The following examples illustrate the invention without limiting it.

EXAMPLE 1

1,6-dimethyl-$8\beta$-N-carbobenzoxyaminomethyl-12-hydroxy-$10\alpha$-ergoline 1.5 g. of 1,6 - dimethyl - $8\beta$ - N - carbobenzoxyaminomethyl - 2,3 - dihydro - $10\alpha$ - ergoline were dissolved in 60 ml. of a 0.1 M aqueous solution of monopotassium phosphate and the pH of the resulting solution was adjusted to 3.8 with citric acid.

A solution of potassium nitrosodisulphonate (2.1 g.) in 60 ml. of 0.1 M monopotassium phosphate was prepared and the pH was adjusted to from 3.5 to 4 with citric acid. This solution was added rapidly to the previous solution under strong stirring. The stirring was continued for 2 minutes, always at room temperature. Thereafter, 200 ml. of ethyl acetate were added and cooled immediately to about 0° C. The solution was neutralized with sodium bicarbonate. The aqueous solution was extracted several times with ethyl acetate. From the extracts combined and evaporated in vacuo, 720 mg. of a yellow greenish residue were obtained. This was chromatographed through a column of silicic acid and eluted with chloroform containing increasing quantities of methanol. The desired product was eluted with chloroform containing 3% of methanol.

Recrystallization from acetone yielded 130 mg. of pure product melting at 210–212° C. The U.V. spectrum shows adsorption maxima at 281 and 310 mμ and a flex at 276 mμ, in ethanol. In alkaline ethanol, it shows an adsorption maximum at 325 mμ.

EXAMPLE 2

1,6-dimethyl-$8\beta$-benzamidomethyl-12-hydroxy-$10\alpha$-ergoline 1.4 g. of 1,6-dimethyl-$8\beta$-benzamidomethyl-2,3-dihydro-$10\alpha$-ergoline were dissolved in 60 ml. of a 0.1 M aqueous solution of monopotassium phosphate and brought to a pH of about 3.5–3.8 with citric acid. Thereafter, under strong stirring, 60 ml. of a 0.1 M monopotassium phosphate solution containing 3 g. of potassium nitrosodisulphonate were added. The solution was allowed to stand for 2 minutes at room temperature, cooled with ice, the pH was adjusted to 7.5–8 and then extracted many times with ethyl acetate. The solvent was evaporated off and the residue was chromatographed over a column of silicic acid and eluted with chloroform containing increasing quantities of methanol.

With 3% of methanol, 90 mg. of the product were obtained, which was taken up with boiling acetone. 55 mg. of product, melting at 280–285° C. (with decomposition), were obtained.

EXAMPLE 3

1,6-dimethyl-$8\beta$-acetamidomethyl-12-hydroxy-$10\alpha$-ergoline 1.2 g. of 1,6-dimethyl-$8\beta$-acetamidomethyl-2,3-dihydro-$10\alpha$-ergoline were dissolved in a 0.1 M aqueous solution of monopotassium phosphate (55 ml.) and the pH was adjusted to 3.7 with citric acid. Thereafter, 55 ml. of a 0.1 M monopotassium phosphate solution containing 2.8 g. of potassium nitrosodisulphonate were added, with strong stirring. The solution was allowed to stand at room temperature for 2 minutes, cooled with ice, the pH was adjusted to about 7.5–8 and extracted many times with ethyl acetate. The solvent was evaporated off and the residue was chromatographed over a column of silicic acid and eluted with chlorofrom containing increasing quantities of methanol.

With 3% of methanol, 80 mg. of product were obtained. This was crystallized from acetone. The U.V. spectrum shows adsorption maxima at (274), 283, 312 mμ (in ethanol) and at (275), 286, 323 mμ (in alkaline ethanol): melting point at 235–237° C.

EXAMPLE 4

1,6-dimethyl-$8\beta$-cyclopentylpropionamidomethyl-12-hydroxy-$10\alpha$-ergoline 2.5 g. of 1,6-dimethyl-$8\beta$-cyclopentylpropionamidomethyl-2,3-dihydro-$10\alpha$-ergoline were dissolved in 120 ml. of a 0.1 M monopotassium phosphate solution. The pH was adjusted to 3.8 with citric acid and under strong stirring, 110 ml. of a 0.1 M monopotassium phosphate solution containing 5.3 g. of potassium nitrosodisulphonate were added. The solution was allowed to stand at room temperature for 2 minutes, cooled with ice. The pH was adjusted to 7.8 and the solution extracted with ethyl acetate. The solvent was evaporated off and the residue thus obtained was chromatographed over a column of silicic acid and eluted with chloroform-methanol.

With 3% of methanol and recrystallization from acetone, 200 mg. of the product were obtained. The U.V. spectrum shows adsorption maxima at (274), 283, 313 mμ (in ethanol) and (276), 286, 323 mμ (in alkaline ethanol): melting point at 117–120° C.

EXAMPLE 5

1,6-dimethyl-$8\beta$-nicotinamidomethyl-12-hydroxy-$10\alpha$-ergoline 1.5 g. of 1,6 - dimethyl-$8\beta$-nicotinamidomethyl-2,3-dihydro-$10\alpha$-ergoline were dissolved in 50 ml. of a 0.1 M monopotassium phosphate solution. The pH was adjusted to about 3.5–3.8 and under strong stirring, 50 ml. of a 0.1 M monopotassium phosphate solution containing 3 g. of potassium nitrosodisulphonate were added. The mix was allowed to stand at room temperature for 2 minutes, cooled with ice, the pH was adjusted to 8 and extracted deeply with ethyl acetate. The solvent was evaporated off and the residue, thus obtained, was chromatographed over a column of silicic acid by elution with chloroform-methanol.

With 3–4% of methanol, 110 mg. of product were obtained. The U.V. spectrum shows adsorption maxima at (276), 283, 314 mμ (in ethanol) and (277), 285, 324 mμ (in alkaline ethanol): M.P. 125–128° C.

Other N-acyl derivatives described hereinabove are prepared in the same manner.

We claim:
1. The process for the preparation of 1,6-dimethyl-10α-ergoline derivatives having the formula:

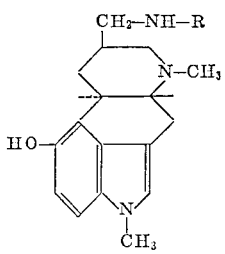

wherein R is selected from the group consisting of
an acyl group of a substituted or unsubstituted saturated aliphatic acid of from 1 to 4 carbon atoms, the substituent being selected from the group consisting of chloro, diethylamino, phenoxy and phenyl;
an acyl group of an alkyl- or benzylcarbonic acid in which the alkyl group has from 1 to 4 carbon atoms;
an acyl group of a saturated cycloaliphatic acid of not more than 8 carbon atoms, wherein the cycloaliphatic ring is of 5 carbon atoms;
an acyl group of an aromatic acid selected from the group consisting of substituted and unsubstituted benzoic acid in which the substituent is selected from the group consisting of chloro and methoxy and an acyl group selected from nicotinic and isonicotinic acid, wherein a compound of the formula:

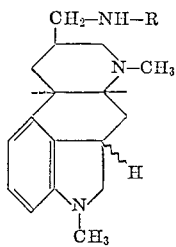

wherein R has the above meaning, is oxidized with potassium nitrosodisulphate, in an acid solution buffered to a pH of from 2 to 5, the product thus obtained is isolated and purified by extraction and chromatography.

2. A compound of the formula:

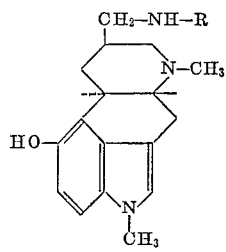

wherein R is selected from the group consisting of
an acyl group of a substituted or unsubstituted saturated aliphatic acid of from 1 to 4 carbon atoms, the substituent being selected from the group consisting of chloro, diethylamino, phenoxy and phenyl;
an acyl group of an alkyl- or benzylcarbonic acid in which the alkyl group has from 1 to 4 carbon atoms;
an acyl group of a saturated cycloaliphatic acid of not more than 8 carbon atoms, wherein the cycloaliphatic ring is of 5 carbon atoms;
an acyl group of an aromatic acid selected from the group consisting of substituted and unsubstituted benzoic acid in which the substituent is selected from the group consisting of chloro and methoxy and an acyl group selected from nicotinic and isonicotinic acid.

3. The compound of claim 2, which is 1,6-dimethyl-8β - N - carbobenzoxyaminomethyl-12-hydroxy-10α-ergoline.

4. The compound of claim 2, which is 1,6-dimethyl-8β-benzamidomethyl-12-hydroxy-10α-ergoline.

5. The compound of claim 2, which is 1,6-dimethyl-8β-acetamidomethyl-12-hydroxy-10α-ergoline.

6. The compound of claim 2, which is 1,6-dimethyl-8β-cyclopentylpropionamidomethyl - 12 - hydroxy-10α-ergoline.

7. The compound of claim 2, which is 1,6-dimethyl-8β-nicotinamidomethyl-12-hydroxy-10α-ergoline.

References Cited
UNITED STATES PATENTS
3,238,211    3/1966    Camerino _____ 260—285.5

DONALD G. DAUS, Primary Examiner

U.S. Cl. X.R.

260—243 B, 247.2 R, 250 R, 251 R, 256.4 B, 268 PE, 424—261